United States Patent
Tomoto et al.

(10) Patent No.: US 9,656,435 B2
(45) Date of Patent: May 23, 2017

(54) TIRE VULCANIZER SYSTEM AND ASSEMBLY METHOD THEREFOR

(71) Applicant: MITSUBISHI HEAVY INDUSTRIES MACHINERY TECHNOLOGY CORPORATION, Hiroshima-shi, Hiroshima (JP)

(72) Inventors: Keiichi Tomoto, Hiroshima (JP); Jiro Agawa, Hiroshima (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 0 days.

(21) Appl. No.: 14/764,157

(22) PCT Filed: Oct. 29, 2013

(86) PCT No.: PCT/JP2013/079263
§ 371 (c)(1),
(2) Date: Jul. 28, 2015

(87) PCT Pub. No.: WO2015/063861
PCT Pub. Date: May 7, 2015

(65) Prior Publication Data
US 2016/0023413 A1 Jan. 28, 2016

(51) Int. Cl.
*B29D 30/06* (2006.01)
*B29C 33/30* (2006.01)
*B29C 35/02* (2006.01)

(52) U.S. Cl.
CPC .......... *B29D 30/065* (2013.01); *B29C 33/303* (2013.01); *B29D 30/0605* (2013.01); *B29C 35/02* (2013.01); *B29D 2030/0651* (2013.01); *B29D 2030/0653* (2013.01)

(58) Field of Classification Search
CPC .............. B29D 30/0605; B29D 30/065; B29D 2030/0651; B29D 2030/0653; B29C 33/303
See application file for complete search history.

(56) References Cited

U.S. PATENT DOCUMENTS

| | | | |
|---|---|---|---|
| 6,547,548 B1 * | 4/2003 | Irie | B29D 30/0601 425/186 |
| 8,714,954 B2 * | 5/2014 | Agawa | B29D 30/0662 425/34.1 |

FOREIGN PATENT DOCUMENTS

| | | |
|---|---|---|
| EP | 1477295 A1 | 11/2004 |
| JP | 52-51060 U | 4/1977 |
| JP | 63-187712 U | 12/1988 |

(Continued)

OTHER PUBLICATIONS

International Search Report mailed Feb. 4, 2014, corresponding to International patent application No. PCT/JP2013/079263.
(Continued)

*Primary Examiner* — James Mackey
(74) *Attorney, Agent, or Firm* — Kanesaka Berner and Partners LLP

(57) ABSTRACT

A tire vulcanizer system in which multiple tire vulcanizers, provided with a frame and a vulcanizing mechanism that is supported by the frame and is for vulcanizing green tires, are connected, wherein the tire vulcanizers are provided with respective alignment sections, which are provided on the respective frames and are for aligning the level positions of adjacent frames relative to each other.

9 Claims, 12 Drawing Sheets

(56) References Cited

FOREIGN PATENT DOCUMENTS

| | | | |
|---|---|---|---|
| JP | 6-334362 | A | 12/1994 |
| JP | 9-239734 | A | 9/1997 |
| JP | 3040626 | B2 | 5/2000 |
| JP | 2000-202831 | A | 7/2000 |
| JP | 3238292 | B2 | 12/2001 |
| JP | 2003-78266 | A | 3/2003 |
| JP | 2004-200492 | A | 7/2004 |
| JP | 2012-176541 | A | 9/2012 |
| TW | I295612 | B | 4/2008 |
| TW | 201302414 | A1 | 1/2013 |

OTHER PUBLICATIONS

Written Opinion mailed Feb. 4, 2014, corresponding to International patent application No. PCT/JP2013/079263.
Search Report in EP Application No. 13896347.5, mailed Feb. 16, 2016.
Office Action in TW Application No. 102139301, mailed May 20, 2016.
Office Action in TW Application No. 102139301, mailed Oct. 26, 2016.
Decision to Grant a Patent in EP Application No. 13896347.5, mailed Feb. 23, 2017.

\* cited by examiner

TIRE VULCANIZER SYSTEM AND ASSEMBLY METHOD THEREFOR

RELATED APPLICATIONS

The present application is a National Phase of International Application Number PCT/JP2013/079263, filed Oct. 29, 2013.

TECHNICAL FIELD

The present invention relates to a tire vulcanizer system and an assembly method therefor.

BACKGROUND ART

Tire vulcanizers including a set of molds that vulcanizes and molds a green tire in a frame are known (for example, refer to PTL 1).

Additionally, there are tire vulcanizer systems that are operated after a plurality of tire vulcanizers each including a set of molds within a frame is arranged side by side on mounts such that the respective frames come in contact with each other (for example, refer to PTL 2).

CITATION LIST

Patent Literature

[PTL 1] Japanese Patent No. 3040626
[PTL 2] Japanese Unexamined Patent Application Publication No. 2000-202831

SUMMARY OF INVENTION

Technical Problem

Meanwhile, in the tire vulcanizer systems, when the plurality of tire vulcanizers is shipped, the tire vulcanizers are precisely positioned and temporarily assembled, and a shipment inspection is performed. In this case, precise positioning of the frames of the tire vulcanizer is performed. Particularly, when automatic conveyance of the molds is performed, positioning is performed such that the error thereof falls within an error range of about ±0.2 mm (0.5 TIR). The plurality of tire vulcanizers is first released from the positioning and individually shipped and conveyed after the shipment inspection. Thereafter, the plurality of tire vulcanizers is precisely positioned and installed again in a conveyance destination.

However, in the above tire vulcanizer systems, the positioning during the shipment inspection should be reproduced in the conveyance destination. Therefore, there are problems in that the time taken for positioning work increases and a burden on a worker is great.

Additionally, in the above tire vulcanizer systems, in order to perform precise positioning, high machining precision is required for the frames of the tire vulcanizers. Therefore, there is a problem in that machining time and inspection time become long.

The invention provides a tire vulcanizer system and an assembly method for a tire vulcanizer system that can shorten the machining time and the inspection time of frames and can alleviate a burden on a worker caused by positioning work.

Solution to Problem

According to a first aspect of the invention, there is provided a tire vulcanizer system obtained by coupling a plurality of tire vulcanizers each including a frame and a vulcanizing mechanism supported by the frame to vulcanize a green tire, in which the tire vulcanizer includes a positioning unit that is provided in each of the frames and determines relative planar positions of the frames adjacent to each other.

According to a second aspect of the invention, in the tire vulcanizer system related to the first aspect, the positioning unit may include a plurality of positioning bodies that is disposed at positions different from each other in a frontward-rearward direction perpendicular to a frame array direction in which the frames are coupled together and arrayed. In addition, the positioning body in the tire vulcanizer system may include a pair of positioning blocks that are arranged side by side in the frame array direction in which the frames are coupled together, is respectively fixed to the frames adjacent to each other, and abut against each other.

According to a third aspect of the invention, in the tire vulcanizer system related to the second aspect, the positioning blocks provided in at least one positioning body of the plurality of positioning bodies may include a first surface that performs positioning in the frame array direction and a second surface that performs positioning in the frontward-rearward direction.

According to a fourth aspect of the invention, in the tire vulcanizer system related to the third aspect, the second surface may be an inclined surface that inclines in the frontward-rearward direction with respect to the frame array direction.

According to a fifth aspect of the invention, in the tire vulcanizer system related to the third or fourth aspect, the positioning blocks provided in at least one positioning body of the plurality of positioning bodies may include only a first surface that performs positioning in the frame array direction.

According to a sixth aspect of the invention, the tire vulcanizer system related to the first aspect may include: a mount that has a convex part on a support surface that supports the frame; and the frame that has a concave part that allows the convex part to be inserted thereinto, and the positioning unit may include the convex part and the concave part.

According to a seventh aspect of the invention, in the tire vulcanizer system related to the first aspect, the positioning unit may include: a first convex part that protrudes upward from a support surface of a mount that supports the frame and has a first surface that performs positioning of a leg unit of the frame in the frame array direction; and a second convex part that protrudes upward from the support surface of the mount that supports the frame and has a second surface that performs positioning of the leg unit in a frontward-rearward direction perpendicular to the frame array direction.

According to a eighth aspect of the invention, the tire vulcanizer system related to the first aspect may include: the frame including a leg unit that has a frame-side key groove formed in a lower surface thereof; and a mount having a mount-side key groove on a support surface that supports the leg unit. The positioning unit may include: a key mechanism that has the frame-side key groove, the mount-side key groove, and a key member and performs positioning in a frontward-rearward direction perpendicular to the frame array direction in which the frames are coupled together and arrayed. In addition, the positioning unit may include a first convex part that protrudes upward from the support surface of the mount that supports the frame and has a first surface that performs positioning of the leg unit of the frame in the frame array direction.

According to a ninth aspect of the invention, in the tire vulcanizer system related to the first to eighth aspects, at least one of a carrying-in unit that carries in a non-vulcanized green tire to a tire vulcanizer, and a carrying-out unit that carries out a vulcanized tire may include a fixing part that is coupled to the respective frames so as to stretch over the frames adjacent to each other and performs positioning of the frames.

According to a tenth aspect of the invention, there is provided an assembly method for a tire vulcanizer system obtained by coupling a plurality of tire vulcanizers each including a frame and a vulcanizing mechanism supported by the frame to vulcanize a green tire. The assembly method for a tire vulcanizer system may include: a temporary assembling step of adjusting the positions of the frames adjacent to each other and temporarily coupling the frames together; and a positioning body attaching step of attaching positioning bodies for positioning to the temporarily coupled frames, respectively. In addition, the assembly method for a tire vulcanizer system may further include: a decoupling step of releasing the coupling between the frames with the positioning bodies attached thereto; and a main assembling step of respectively attaching the frames between which the coupling has been released to installation locations such that the relative positions of the frames are constrained by the positioning bodies.

Advantageous Effects of Invention

According to the tire vulcanizer system and the assembly method for a tire vulcanizer system of the invention, the machining time and the inspection time of the frames can be shortened, and it is possible to alleviate a burden on a worker caused by positioning work.

DESCRIPTION OF EMBODIMENTS

Hereinafter, a tire vulcanizer system in a first embodiment of the invention will be described with reference to the drawings.

Figure 1:
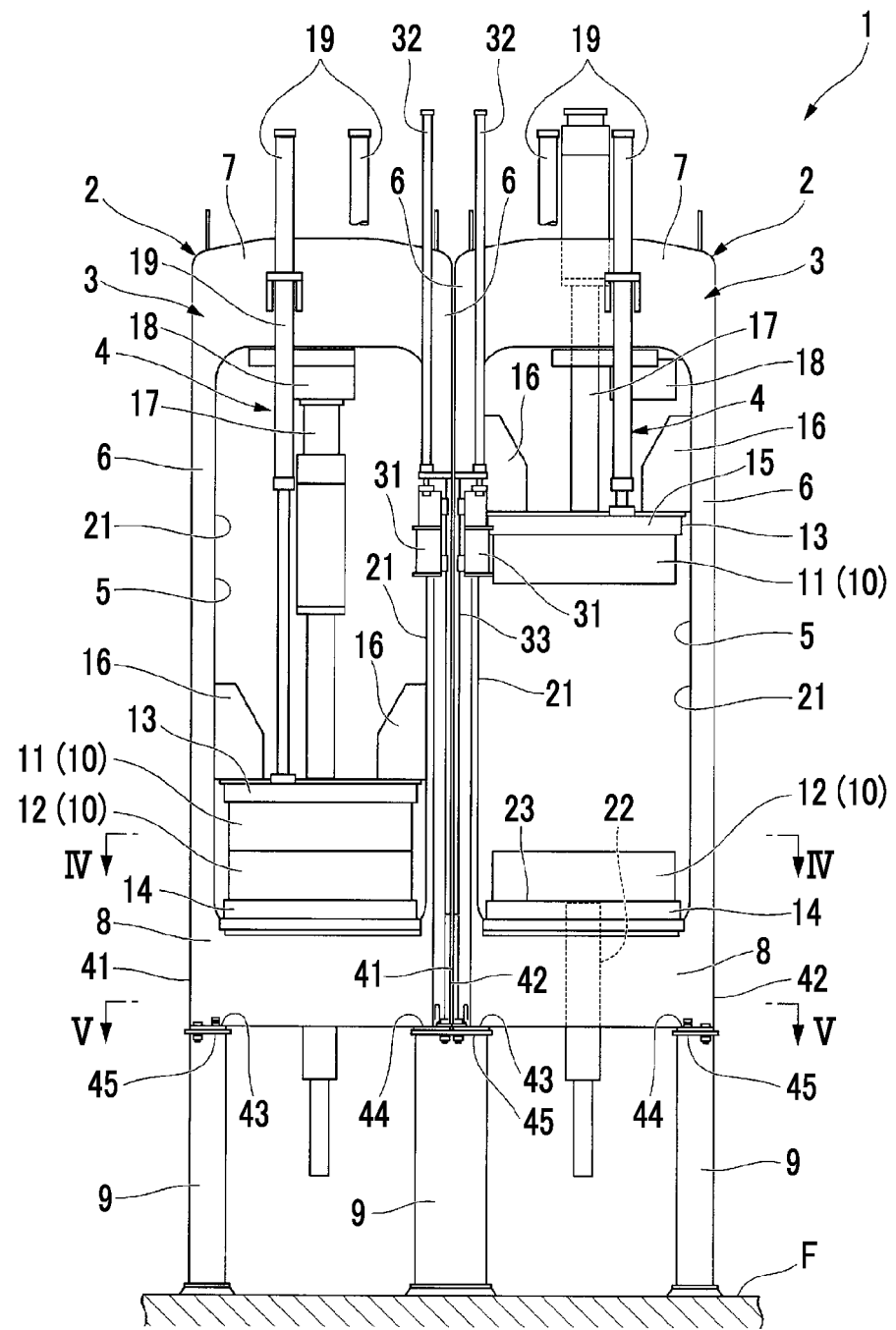
FIG. 1 is a front view illustrating the overall configuration of a tire vulcanizer system in a first embodiment of the invention.

FIG. 1 is a front view illustrating the overall configuration of a tire vulcanizer system 1 in the first embodiment of the invention.

As illustrated in FIG. 1, the tire vulcanizer system 1 of this embodiment includes a plurality of tire vulcanizers 2. Each of the plurality of tire vulcanizers 2 includes a frame 3 and a vulcanizing mechanism 4. In this embodiment, a case where two sets of the tire vulcanizers 2 are arranged side by side will be described as an example.

The frame 3 houses the vulcanizing mechanism 4 therein. The frame 3 forms a long gate shape in the upward-downward direction. The frame 3 has side walls 6 on the left and right sides thereof such that openings 5 are disposed on the front and back sides thereof. Additionally, the frame 3 includes an upper frame 7 and a lower frame 8 that connects upper and lower parts of the left and right side walls 6. The frames 3 are respectively installed in a state where the frames are suspended upward from an installation surface F by a predetermined distance by mounts 9 installed on the installation surface F. The respective frames 3 of the plurality of tire vulcanizers 2 are arranged side by side in a row such that the side walls 6 thereof face each other.

The vulcanizing mechanism 4 includes a mold 10. The mold 10 includes an upper mold 11 and a lower mold 12. The vulcanizing mechanism 4 includes an upper mold supporting mechanism 13 that supports the upper mold 11, and a lower mold supporting mechanism 14 that supports the lower mold 12.

The upper mold supporting mechanism 13 includes an upper movable body 15, guide brackets 16, a pressurizing force transmission member 17, a pressurizing cylinder 18, and a lifting cylinder 19.

The upper movable body 15 detachably supports the upper mold 11.

The guide brackets 16 liftably support the upper movable body 15. The guide brackets 16 are fixed to an upper part of the upper movable body 15. The guide brackets 16 are guided by guide rails 21 provided on the side walls 6 of the frame 3, and are slidable up and down.

The pressurizing force transmission member 17 is a member that transmits pressure for mold-clamping to the mold 10. The pressurizing force transmission member 17 transmits a pressurizing force caused by the pressurizing cylinder 18 to the upper mold 11, and fastens the upper mold 11 and the lower mold 12 together. A lower end of the pressurizing force transmission member 17 is fixed to the upper movable body 15. Additionally, the pressurizing force transmission member 17 is supported so as to be liftable with respect to the upper frame 7.

The pressurizing cylinder 18 is a fluid pressure type cylinder. The pressurizing cylinder 18 presses the pressurizing force transmission member 17 against the mold 10 side, in a state where the upper mold 11 and the lower mold 12 are fastened together.

The lifting cylinder 19 is a cylinder that lifts and lowers the upper movable body 15 in order to open and close the mold 10. The lifting cylinder 19 is fixed to the upper frame 7. The lifting cylinder 19 changes the position of the upper mold 11 in the upward-downward direction with respect to the upper frame 7.

The lower mold supporting mechanism 14 mainly includes a center mechanism 22 and a lower platen 23.

The center mechanism 22 is disposed at a central part of the lower platen 23. The center mechanism 22 is attached to the lower platen 23 so as to be slidable in the upward-downward direction. A bladder (not illustrated) that supports the inside of a tire is attached to the center mechanism. A vulcanized tire is made to be releasable from the lower mold 12, for example, by opening the mold 10 to lift the center mechanism 22 after the tire is vulcanized and molded.

The lower platen 23 supports the lower mold 12 from below. The lower platen 23 includes a heating mechanism (not illustrated) capable of heating the mold 10.

Figure 2:
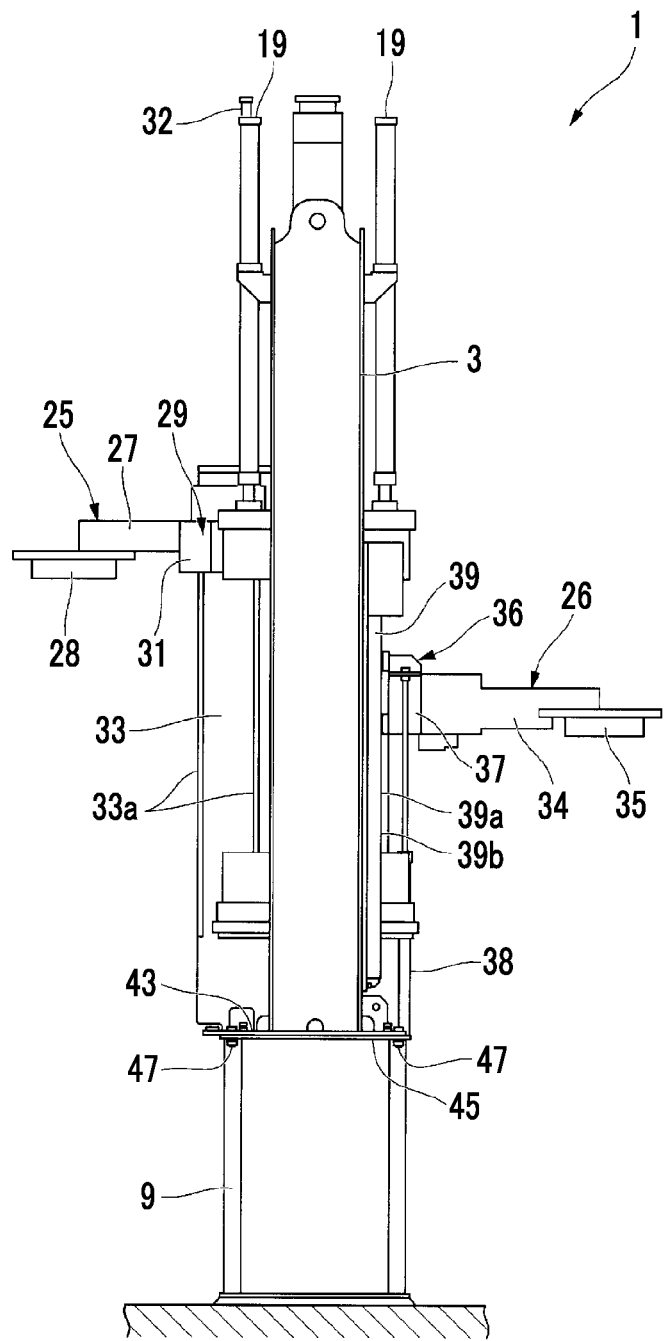
FIG. 2 is a side view of the tire vulcanizer system in the first embodiment of the invention.
Figure 3:
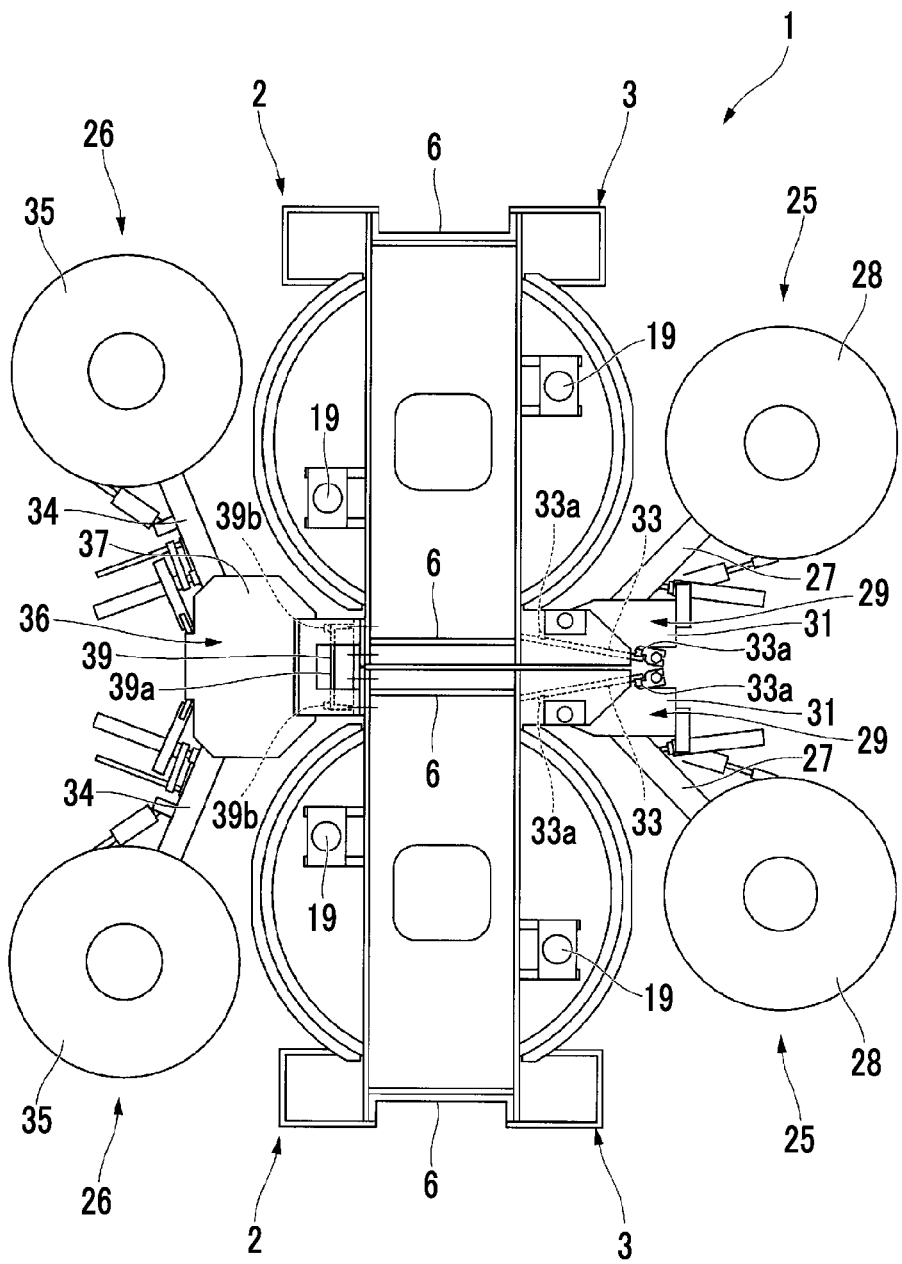
FIG. 3 is a plan view of the tire vulcanizer system in the first embodiment of the invention.
Figure 4:
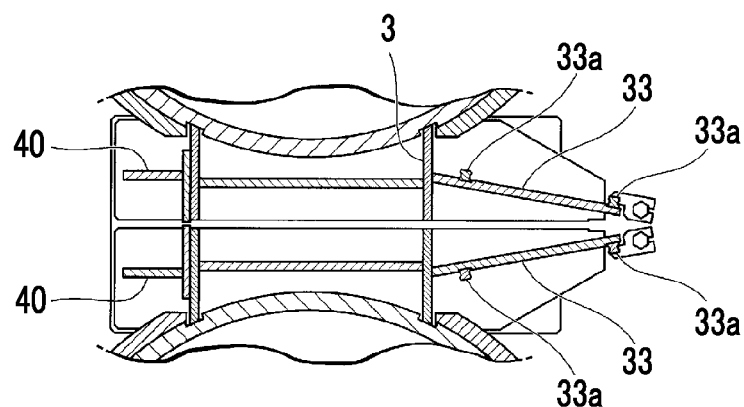
FIG. 4 is a sectional view taken along line IV-IV of FIG. 1.

FIG. 2 is a side view of the tire vulcanizer system 1 in this embodiment. FIG. 3 is a plan view of the tire vulcanizer system 1 in this embodiment. FIG. 4 is a sectional view taken along line IV-IV of FIG. 1.

As illustrated in FIGS. 2 and 3, the tire vulcanizer system 1 includes a tire loader 25 and a tire unloader 26. Here, in this embodiment, the tire loader 25 is disposed on a front side in a frontward-rearward direction perpendicular to an array direction (hereinafter, simply referred to as a frame array direction) of the frames 3 with respect to the tire vulcanizers 2 adjacent to each other. Additionally, a case where the tire unloader 26 is disposed on a rear side in the frontward-rearward direction with respect to the tire vulcanizers 2 adjacent to each other will be described as an example.

The tire loader 25 is a device that transfers a green tire before vulcanization molding, which is supplied from the outside, to the above-described vulcanizing mechanism 4. One tire loader 25 is provided for each of the tire vulcanizers 2 adjacent to each other. The tire loaders 25 are disposed on the front side between the tire vulcanizers 2 adjacent to each other. The tire loader 25 includes a turning arm 27, a tire chuck 28, and a loader lifting mechanism 29.

The turning arm 27 is made rockable between a first position where a tire is transferred to each of the left and right vulcanizing mechanisms 4 and a second position where the tire is received from the outside. The turning arm 27 is driven, for example, by a fluid pressure cylinder or the like.

The tire chuck 28 is a device that holds a green tire in order to lift the green tire. The tire chuck 28 is provided at a tip part of the turning arm 27. The tire chuck 28 is able to hold the bead inside of a green tire with a plurality of locking parts (not illustrated) capable of being protruded and retracted. The tire chuck 28 is brought into a state where the tire chuck holds a green tire at a predetermined timing when the turning arm 27 is at the second position. On the other hand, the tire chuck 28 releases a green tire holding state when the turning arm 27 is at the first position. In FIG. 1, illustration of the turning arm 27 and the tire chuck 28 of the tire loader 25 is omitted for the sake of convenience of illustration.

The loader lifting mechanism 29 is a mechanism that lifts and lowers the turning arm 27 that has the tire chuck 28 provided at a tip thereof. The loader lifting mechanism 29 includes a main lift body 31, a lifting cylinder 32, and a guide rail 33.

The main lift body 31 rockably supports the above-described turning arm 27. The main lift body 31 is made movable up and down along the guide rail 33. Additionally, the lifting cylinder 32 is connected to the main lift body 31. The main lift body 31 moves up and down along the guide rail 33 according to the extension and retraction of the lifting cylinder 32.

The lifting cylinder 32 generates driving power that changes the position of the main lift body 31 in the upward-downward direction on the basis of a control command of a control device (not illustrated). In this embodiment, an end of a rod part of the lifting cylinder 32 is connected to the main lift body 31, and a main body part of the lifting cylinder 32 is supported by the frame 3.

The guide rail 33 guides the main lift body 31 in the upward-downward direction.

As illustrated in FIGS. 3 and 4, the guide rail 33 is attached so as to protrude toward the front from the edge of the frame 3 on a side where the frames 3 adjacent to each other face each other. The guide rails 33 are inclined and formed so as to approach each other toward the front. Two main rail bodies 33a are provided on the outer surface of the guide rail 33 that faces each side of the vulcanizing mechanism 4. The main rail bodies 33a are formed so as to extend in the upward-downward direction, respectively. The above-described main lift body 31 is liftably attached to the respective main rail bodies 33a, respectively, in a posture where the turning arm 27 faces each vulcanizing mechanism 4 side.

As illustrated in FIGS. 2 and 3, the tire unloader 26 is a device that carries out a vulcanized and molded tire from the above-described vulcanizing mechanism 4. The tire unloader 26 is provided between the tire vulcanizers 2 adjacent to each other, similar to the above-described tire loader 25. Additionally, the tire unloader 26 is provided on the rear side that is a side opposite to the tire loader 25 in the frontward-rearward direction. The tire unloader 26 includes a turning arm 34, a tire chuck 35, and an unloader lifting mechanism 36.

The turning arm 34 is made rockable between a first position where a vulcanized tire is received from each of the left and right vulcanizing mechanisms 4 and a second position where the vulcanized tire is transferred to external conveying means or the like. The turning arm 34 is driven, for example, by a fluid pressure cylinder or the like, similar to the turning arm 27.

Additionally, the turning arm 34 can also be rocked among a first position where a tire is received, a second position where the tire is transferred to a cooling device (not illustrated) that cools a vulcanized tire, and a third position where the cooled tire of the cooling device is transferred to external transporting means or the like.

The tire chuck 35 is a device that holds a vulcanized tire, in order to lift the vulcanized tire. The tire chuck 35 is provided at a tip part of the turning arm 34. The tire chuck 35 is able to hold the bead inside of a vulcanized tire with a plurality of locking parts (not illustrated) capable of being protruded and retracted, similar to the tire chuck 28 of the above-described tire loader 25. The tire chuck 35 is brought into a state where the tire chuck holds a vulcanized tire when the turning arm 34 is at the first position. On the other hand, the tire chuck 35 releases a state where the tire chuck holds a vulcanized tire at a predetermined timing when the turning arm 34 is at the second position.

The unloader lifting mechanism 36 is a mechanism that lifts and lowers the two turning arms 34 that have the tire chucks 35 provided at the tips of the turning arms. That is, the unloader lifting mechanism 36 is shared by the two tire unloaders 26. The unloader lifting mechanism 36 includes a main lift body 37, a lifting cylinder 38, and a guide rail 39.

The main lift body 37 is made movable up and down along the guide rail 39. The main lift body 37 rockably supports the above-described two turning arms 34. The lifting cylinder 38 is connected to the main lift body 37 (refer to FIG. 2). The main lift body 37 moves up and down along the guide rail 39 according to the extension and retraction of the lifting cylinder 38.

The lifting cylinder 38 generates driving power that changes the position of the main lift body 37 in the upward-downward direction on the basis of a control command of a control device (not illustrated).

The guide rail 39 extends in the upward-downward direction in order to guide the main lift body 37 in the upward-downward direction. As illustrated in FIG. 3, the guide rail 39 is formed so as to protrude toward the rear from the frame 3. The guide rail 39 stretches over the frames 3 adjacent to each other, and is fixed to respective edges of the respective frames 3 with fastening members (not illustrated), such as bolts. By fixing the guide rail 39 so as to stretch over the two frames 3 in this way, rear edges of the side walls 6 are positioned and the distance between the rear edges of the side walls 6 is maintained at a predetermined distance.

The guide rail 39 has a pair of main rail bodies 39b on a rear surface 39a thereof. The main rail bodies 39b are respectively formed so as to extend in the upward-downward direction. The above-described main lift body 37 is liftably attached to the respective main rail bodies 39b so as to face the rear. Additionally, as illustrated in FIG. 4, a rib 40 that protrudes rearward from the frame 3 and extends in the upward-downward direction is formed below the guide rail 39.

Figure 5:
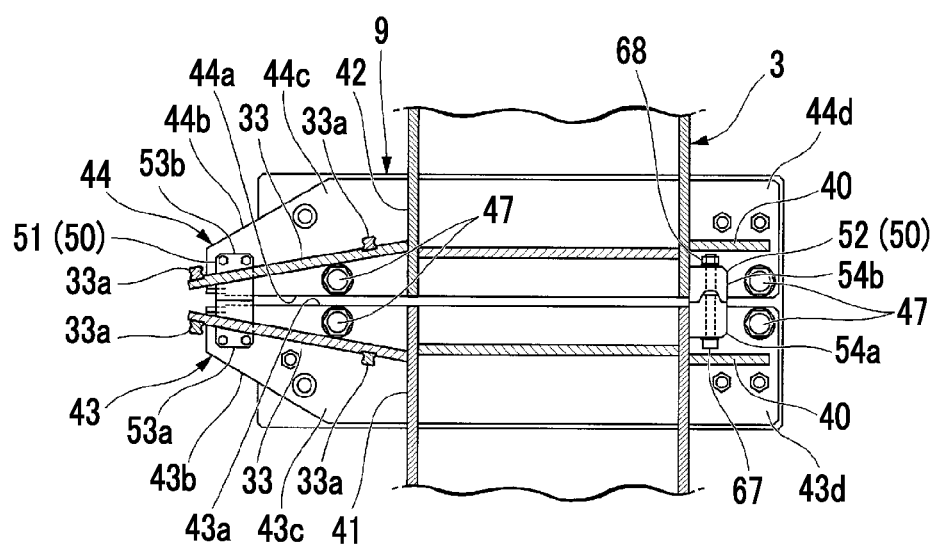
FIG. 5 is a sectional view taken along line V-V of FIG. 1.
Figure 6:
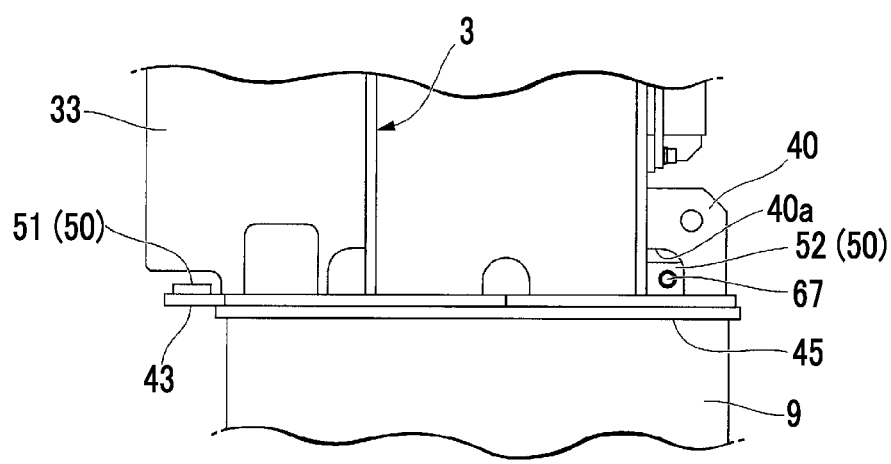
FIG. 6 is a side view of a leg unit in the first embodiment of the invention.
Figure 7:
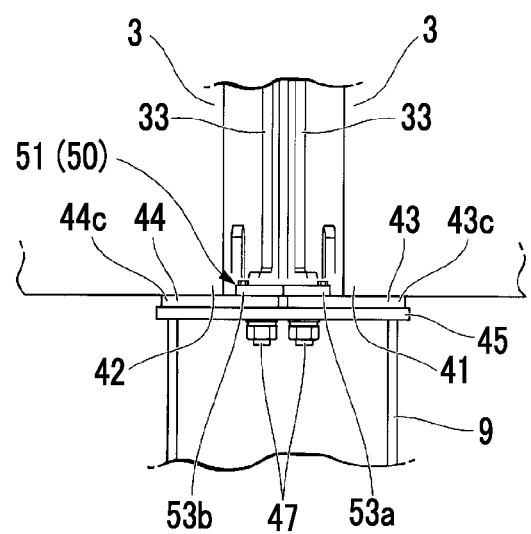
FIG. 7 is a front view of the leg unit in the first embodiment of the invention.
Figure 8:
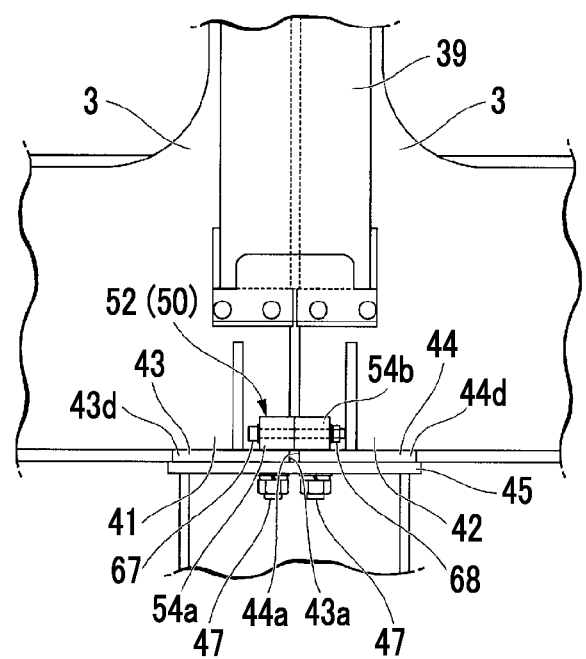
FIG. 8 is a back view of the leg unit in the first embodiment of the invention.

FIG. 5 is a sectional view taken along line V-V of FIG. 1. FIG. 6 is a side view of leg units 43 and 44. FIG. 7 is a front view of the leg units 43 and 44. FIG. 8 is a back view of the leg units 43 and 44.

As illustrated in FIG. 1, the frame 3 has the leg unit 43 at a first end 41 in the frame array direction, and has the leg unit 44 at a second end 42 in the frame array direction. The leg units 43 and 44 are respectively attached to a lower end of the frame 3, and are formed in the shape of a flat plate that extends back and forth. As illustrated in FIG. 1 and FIG. 5, the leg units 43 and 44 are arranged such that outer edges 43a and 44a in the frame array direction face each other.

As illustrated in FIG. 5, the leg units 43 and 44 are formed symmetrically to each other in the frame array direction. Front parts 43c and 44c of the leg units 43 and 44 have inclined edges 43b and 44b that incline so as to approach the outer edges 43a and 44a while being closer to the front, on sides opposite to the outer edges 43a and 44a in the frame array direction. Accordingly, the overall outline of the front parts 43c and 44c that are abutted against each other are formed in a tapered shape toward the front. Additionally, as illustrated in FIGS. 6 and 7, the guide rail 33 that extends up and down is formed on the upper surfaces of the leg units 43 and 44.

Meanwhile, as illustrated in FIG. 5, rear parts 43d and 44d of the leg units 43 and 44 are formed in a rectangular shape in a plan view. The above-described ribs 40 are attached to the rear parts 43d and 44d. As illustrated in FIG. 6, the rib 40 is formed with a service hole 40a for performing the work of fastening a rear part positioning body 52 to be described below with a bolt 67 and a nut 68.

As illustrated in FIG. 7, the mounts 9 support the first end 41 and the second end 42 from below in the frame array direction. Bearing parts 45 are respectively formed at upper ends of the mounts 9. The bearing parts 45 are formed in the shape of a flat plate including upper surfaces that face lower surfaces of the leg units 43 and 44. Here, the leg units 43 and 44 are fastened to the bearing parts 45 by a plurality of fastening members 47 (refer to FIG. 5), such as bolts and nuts, in a state where the frames 3 adjacent to each other are precisely positioned.

As illustrated in FIG. 5 to FIG. 8, the frame 3 includes a positioning unit 50 for determining the relative planar positions of the frames 3 adjacent to each other.

The positioning unit 50 includes a front part positioning body 51 and a rear part positioning body 52. As illustrated in FIG. 5, the front part positioning body 51 includes a pair of front part positioning blocks 53a and 53b. The rear part positioning body 52 includes a pair of rear part positioning blocks 54a and 54b.

As illustrated in FIGS. 5 and 7, the front part positioning blocks 53a and 53b are disposed side by side in the frame array direction. The front part positioning block 53a is attached to the front part 43c of the leg unit 43. The front part positioning block 53b is attached to the front part 44c of the leg unit 44. The front part positioning blocks 53a and 53b in this embodiment are respectively fixed to the leg units 43 and 44 with bolts, nuts, or the like.

As illustrated in FIGS. 5 and 8, the rear part positioning blocks 54a and 54b are disposed side by side in the frame array direction, similar to the front part positioning blocks 53a and 53b. The rear part positioning block 54a is attached to the rear part 43d of the leg unit 43. The rear part positioning block 54b is attached to the rear part 44d of the leg unit 44. The rear part positioning blocks 54a and 54b in this embodiment are respectively fixed to the leg units 43 and 44 by welding or the like.

Figure 9:
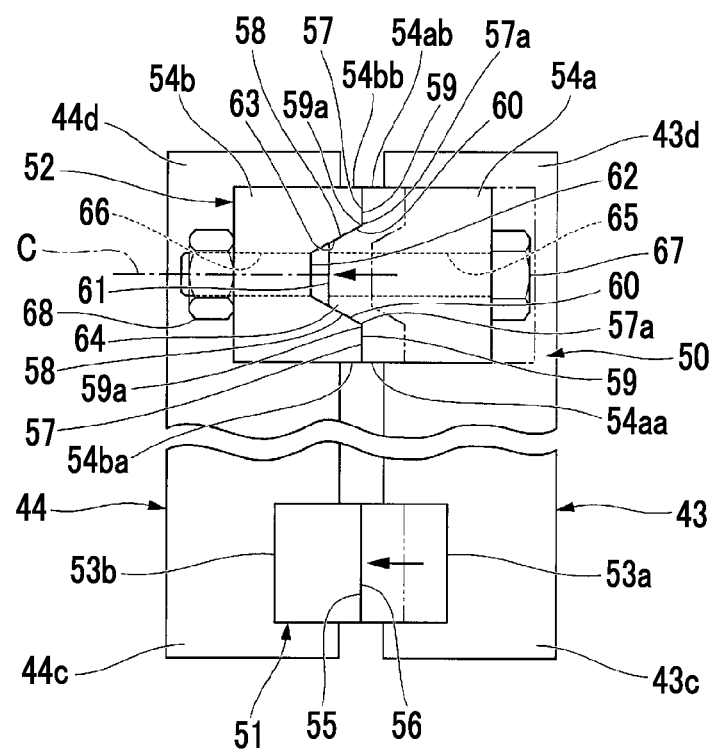
FIG. 9 is a plan view of a positioning unit in the first embodiment of the invention.

FIG. 9 is a plan view illustrating the positioning unit 50.

As illustrated in FIG. 9, the front part positioning block 53a includes a first surface 55. The front part positioning block 53b includes a first surface 56. The first surfaces 55 and 56 are respectively flat surfaces that extend in the frontward-rearward direction and the upward-downward direction. The first surfaces 55 and 56 abut against each other face to face, thereby performing the relative positioning of the front parts 43c and 44c in the frame array direction.

The rear part positioning block 54a includes two first surfaces 57 and two second surfaces 58. The rear part positioning block 54b includes two first surfaces 59 and two second surfaces 60. The first surfaces 57 and 59 are respectively flat surfaces that extend in the frontward-rearward direction and the upward-downward direction. The first surfaces 57 and 59 abut against each other face to face, thereby performing the relative positioning of the rear parts 43d and 44d in the frame array direction. The two first surfaces 57 are distributed on a front part 54aa and a rear part 54ab of the rear part positioning block 54a. The two first surfaces 59 are also distributed on a front part 54ba and a rear part 54bb of the rear part positioning block 54b so as to face the two first surfaces 57.

The two second surfaces 58 are inclined flat surfaces that extend from end edges 57a of the two first surfaces 57 on central part C sides in the frontward-rearward direction toward the central part C sides in the frame array direction, respectively. The two second surfaces 60 are also inclined flat surfaces that extend from end edges 59a of the two first surfaces 59 toward the central part C sides in the frame array direction, respectively.

The second surface 58 extends so as to protrude outward in the width direction of the frame 3 in the frame array direction. Meanwhile, the second surface 60 extends so as to enter inward in the width direction of the frame 3 in the frame array direction. The second surfaces 58 and 60 abut against each other face to face, thereby performing the relative positioning of the rear parts 43d and 44d of the frame 3 in the frontward-rearward direction. The second surfaces 58 are connected together by a connecting surface 61. The second surfaces 60 are connected together by a connecting surface 62. Additionally, the second surface 58 is formed so as to be longer than the second surface 60 in the inclined direction.

In other words, the rear part positioning block 54a includes a convex part 64 that is formed by two second surfaces 58 and one connecting surface 61 and has a trapezoidal section. The rear part positioning block 54b includes a concave part 63 that is formed by two second surfaces 60 and one connecting surface 62 and has a trapezoidal section. The depth of the concave part 63 is made larger than the protruding height of the convex part 64. That is, as the convex part 64 is completely embedded in the concave part 63, the above-described second surfaces 58 and 60 abut against each other to perform positioning of the frame 3 of the frontward-rearward direction, and the first surfaces 57 and 59 abut against each other to perform positioning of the frame in the frame array direction.

Through-holes 65 and 66 are respectively formed in the frame array direction in the rear part positioning block 54a and the rear part positioning block 54b. One bolt 67 is inserted through the through-holes 65 and 66 and is fastened with nuts 68. That is, the rear part positioning block 54a and the rear part positioning block 54b are displaced in approaching directions simply by passing the bolt 67 through the through-holes 65 and 66 and fastening the nuts 68 in a state where the convex part 64 is not completely embedded in the above-described concave part 63. Then, the second surface 58 of the convex part 64 that is an inclined flat surface is guided to the second surface 60 of the concave part 63 that is an inclined flat surface, and the convex part 64 is completely embedded in the concave part 63. As a result, positioning of the frame 3 in the frame array direction and positioning of the frame 3 in the frontward-rearward direction are performed.

In the frame 3 in this embodiment, positional adjustment of the frame in the height direction is performed, for example, by sandwiching a thin plate-shaped liner (not illustrated) between the leg unit 43 or the leg unit 44 and the mount 9.

The tire vulcanizer system 1 in this embodiment includes the above-described configuration. Next, an assembly method for a tire vulcanizer system 1 will be described referring to FIG. 10.

First, a plurality of tire vulcanizers 2 is individually assembled, respectively.

Next, for a shipment inspection, the plurality of tire vulcanizers 2 is arrayed on the mounts 9 so as to satisfy the same conditions as the installation conditions in a delivery destination. Moreover, the positioning of the frames 3 adjacent to each other are precisely performed, and the frames are fixed by the fastening member 47 (temporary assembling step; Step S01). Additionally, the tire unloaders 26 are fixed so as to stretch over the frames 3. Moreover, the tire loaders 25 and all of various peripheral devices, such as required piping, are attached. In this state, various kinds of inspections, such as an operation check, is performed.

Next, the front part positioning blocks 53a and 53b and the rear part positioning blocks 54a and 54b for positioning are respectively attached to the temporarily coupled frames 3 (positioning body attaching step; Step S02).

In this case, the front part positioning blocks 53a and 53b are respectively fixed to the leg units 43 and 44 with bolts, nuts, or the like in a state where the respective first surfaces 55 and 56 of the front part positioning blocks 53a and 53b abut against each other.

Moreover, in this case, the rear part positioning blocks 54a and 54b are respectively fixed to the leg units 43 and 44 by welding or the like in a state where the respective first surfaces 57 and 59 of the rear part positioning blocks 54a and 54b abut against each other and the respective second surfaces 58 and 60 abut against each other.

Next, the coupling between the frames 3 is released, with the front part positioning blocks 53a and 53b and the rear part positioning blocks 54a and 54b being attached to the frames 3 (decoupling step; Step S03). Here, the respective tire vulcanizers 2 between which the coupling is released are individually conveyed to a delivery destination or the like. The same mounts as the mounts 9 used during the shipment inspection are installed in advance in the delivery destination.

Next, the respective tire vulcanizers 2 between which the coupling are released are attached side by side installation locations, such as a delivery destination (main assembling step; Step S04). In detail, the respective tire vulcanizers 2 are first installed on the mounts 9. Moreover, positioning is performed such that the relative positions of the frames 3 adjacent to each other are constrained by the front part positioning blocks 53a and 53b and the rear part positioning blocks 54a and 54b. In this case, positioning of the rear part positioning blocks 54a and 54b is performed by fastening the rear part positioning blocks with the bolt 67 and the nuts 68. Additionally, if required, height adjustment is performed by the liner. Moreover, positioning of the frames 3 is performed by the tire unloaders 26 of the frames 3 at the intermediate positions in the height direction. Additionally, all of the accessories, required piping, and the like are attached. Thereafter, the leg units 43 and 44 are fixed to the mounts 9 by the fastening members 47.

Therefore, according to the tire vulcanizer system 1 of the above-described first embodiment, the relative planar positions of the frames 3 can be determined by the positioning unit 50. Therefore, for example, the relative planar positions of the frames 3 during a shipment inspection at a shipment destination can be reproduced, for example, by determining the relative planar positions of the frames during a shipment inspection using the positioning unit 50. Additionally, since the relative planar positions of the frames 3 can be determined by the positioning unit 50, the relative planar positions of the frames 3 can be determined even if the machining precision of the frames 3 themselves is low. As a result, the machining time and the inspection time of the frames 3 can be shortened. Additionally, a burden on a worker related to positioning work can be reduced.

Moreover, the relative planar positions of the frames 3 can be determined in a plurality of places of the frames 3 in the frontward-rearward direction by providing the front part positioning body 51 and the rear part positioning body 52 as a plurality of positioning bodies in the frontward-rearward direction. Additionally, the relative planar positions of the frames 3 can be determined simply by making the front part positioning blocks 53a and 53b of the positioning unit 50 abut against each other and making the rear part positioning blocks 54a and 54b abut against each other. As a result, the relative planar positions of the frames 3 can be easily determined. Therefore, the burden on the worker can be further reduced.

Moreover, positioning in the frame array direction can be performed by the first surfaces 57 and 59, and positioning in the frontward-rearward direction can be performed by the second surfaces 58 and 60. Therefore, the relative planar positions of the respective frames 3 in the frame array direction and the frontward-rearward direction can be determined by one rear part positioning body 52. As a result, the number of positioning bodies can be reduced as compared to a case where a positioning body that performs positioning in the frame array direction and a positioning body that performs positioning in the frontward-rearward direction are individually provided.

Additionally, since the second surfaces 58 and 60 are the inclined surfaces that incline in the frame array direction and the frontward-rearward direction, the second surface 60 can be guided by the second surface 58 to smoothly perform positioning when the rear part positioning blocks 54a and 54b are made to abut against each other.

Moreover, when the rear part positioning body 52 includes both of the first surfaces 57 and 59 and the second surfaces 58 and 60, positioning of the frames in the frame array direction can be performed in two places in the frontward-rearward direction, using the front part positioning blocks 53a and 53b of a simple shape including only the first surfaces 55 and 56, as the front part positioning body 51. As a result, a reduction of a burden on the worker applied to the machining of the front part positioning blocks 53a and 53b and a reduction of working hours can be achieved by an amount equivalent to using the front part positioning blocks 53a and 53b of a simpler shape.

Additionally, in addition to positioning the frames 3 adjacent to each other by the positioning unit 50, positioning the frames 3 adjacent to each other can be performed by the guide rail 39 of the tire unloaders 26. As a result, the relative positioning of the respective frames 3 at the vertical positions of the frames 3 adjacent to each other to which the guide rail 39 is fixed can be performed. Additionally, since the frames 3 adjacent to each other can be positioned using the guide rail 39, an increase in the number of parts can be suppressed.

Moreover, according to the assembly method for a tire vulcanizer system in this embodiment, front part positioning blocks 153a and 153b and rear part positioning blocks 154a and 154b are attached by the positioning body attaching step after positional adjustment is performed by the temporary assembling step. Therefore, even if the coupled state is released by the decoupling step, the state where positional adjustment is performed by the temporary assembling step can be reproduced in the main assembling step by performing positioning of the respective frames 3 using the front part positioning blocks 153a and 153b and the rear part positioning blocks 154a and 154b.

Next, a tire vulcanizer system in a second embodiment of the invention will be described with reference to the drawings.

Here, since the tire vulcanizer system of the second embodiment is different from the tire vulcanizer system of the above-described first embodiment only in terms of the configuration of the positioning unit, a description will be made with the same parts designated by the same reference numerals. Additionally, the description that duplicates the description of the first embodiment will be omitted.

Figure 11:
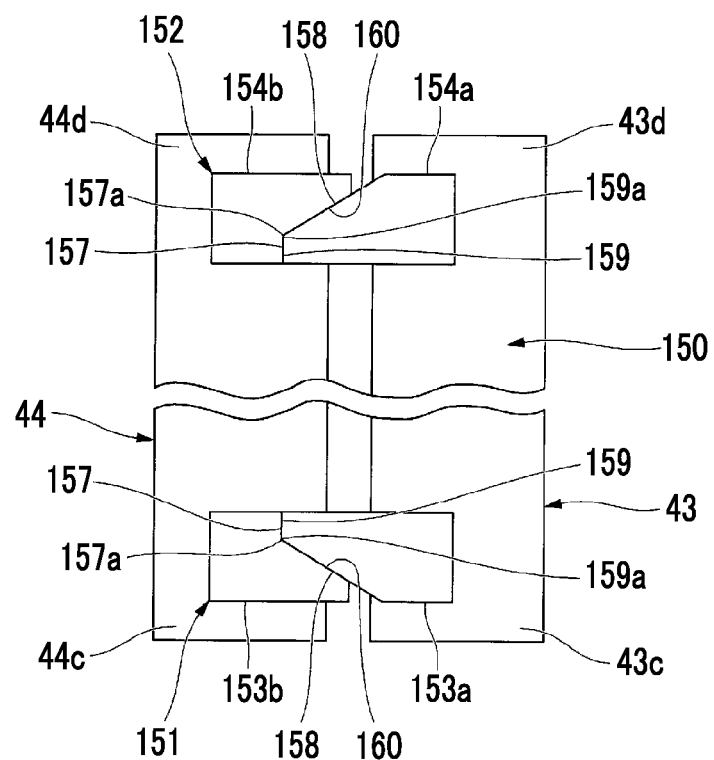
FIG. 11 is a plan view equivalent to FIG. 9 illustrating a positioning unit in a second embodiment of the invention.

FIG. 11 is a plan view equivalent to FIG. 9 illustrating a positioning unit 150 in this embodiment.

As illustrated in FIG. 11, the positioning unit 150 includes a front part positioning body 151 and a rear part positioning body 152.

The front part positioning body 151 includes a pair of front part positioning blocks 153a and 153b.

The rear part positioning body 152 includes a pair of rear part positioning blocks 154a and 154b.

The front part positioning blocks 153a and 153b are disposed side by side in the frame array direction (leftward-rightward direction of the paper surface of FIG. 11). The front part positioning block 153a is attached to a front part 43c of the leg unit 43. The front part positioning block 153b is attached to the front part 44c of a leg unit 44.

The rear part positioning blocks 154a and 154b are disposed side by side in the frame array direction, similar to the front part positioning blocks 153a and 153b. The rear part positioning block 154a is attached to a rear part 43d of the leg unit 43. The rear part positioning block 154b is attached to a rear part 44d of the leg unit 44.

The front part positioning blocks 153a and 153b and the rear part positioning blocks 154a and 154b in this embodiment are respectively fixed to the leg units 43 and 44 by welding or the like. The front part positioning body 151 and the rear part positioning body 152 in this embodiment have symmetrical shapes in the frontward-rearward direction.

The front part positioning block 153a includes a first surface 157 and a second surface 158. The front part positioning block 153b includes a first surface 159 and a second surface 160. The first surfaces 157 and 159 are respectively flat surfaces that extend in the frontward-rearward direction and the upward-downward direction. The first surfaces 157 and 159 abut against each other face to face, thereby performing the relative positioning of the front parts 43c and 44c in the frame array direction.

The second surface 158 is also an inclined flat surface that extends from a forward end edge 157a of the first surface 157 toward the front in the frame array direction. Similarly, the second surface 160 is also an inclined flat surface that extends from an end edge 159a of the first surface 159 toward the front in the frame array direction. The second surfaces 158 and 160 abut against each other face to face, thereby performing the relative positioning of the front parts 43c and 44c of the frame 3 in the frontward-rearward direction. Since the front part positioning body 151 and the rear part positioning body 152 in this embodiment have symmetrical shapes in the frontward-rearward direction, the parts corresponding to each other will be designated by the same reference numerals, and the detailed description of the rear part positioning body 152 will be omitted.

That is, the respective second surfaces 158 of the front part positioning body 151 and the rear part positioning body 152 are sandwiched by the second surface 160 of the front part positioning body 151 and the second surface 160 of the rear part positioning body 152 from the outside in the frontward-rearward direction in a state where the first surfaces 157 and 159 abut against each other.

An assembly method for a tire vulcanizer system in this second embodiment is different from the assembly method for a tire vulcanizer system in the above-described first embodiment in that fastening is not performed by the bolt 67 and the nuts 68. Therefore, the description of the assembling method in the second embodiment will be omitted.

Therefore, according to the tire vulcanizer system of the above-described second embodiment, the relative planar positions of the frames 3 can be determined by the positioning unit 150, similar to the first embodiment. Therefore, for example, the relative planar positions of the frames 3 during a shipment inspection at a shipment destination can be reproduced, for example, by determining the relative planar positions of the frames 3 during a shipment inspection using the positioning unit 150. Additionally, since the relative planar positions of the frames 3 can be determined by the positioning unit 150, the relative planar positions of the frames 3 can be determined even if the machining precision of the frames 3 themselves is low. As a result, the machining time and the inspection time of the frames 3 can be shortened. Additionally, a burden on a worker related to positioning work can be reduced.

Additionally, the relative planar positions of the frames 3 can be determined in a plurality of places of the frames 3 in the frontward-rearward direction by providing the front part positioning body 151 and the rear part positioning body 152 as a plurality of positioning bodies in the frontward-rearward direction. Additionally, the relative planar positions of the frames 3 can be determined simply by making the front part positioning blocks 153a and 153b of the positioning unit 150 abut against each other and making the rear part positioning blocks 154a and 154b abut against each other. As a result, the relative planar positions of the frames 3 can be easily determined. Therefore, the burden on the worker can be further reduced.

Moreover, positioning in the frame array direction can be performed by the first surfaces 157 and 159, and positioning in the frontward-rearward direction can be determined by the second surfaces 158 and 160. Therefore, the relative planar positions of the respective frames 3 in the frame array direction and the frontward-rearward direction can be determined by the rear part positioning body 152 and the front part positioning body 151. As a result, the number of positioning bodies can be reduced as compared to a case where a positioning body that performs positioning in the frame array direction and a positioning body that performs positioning in the frontward-rearward direction are individually provided.

Additionally, since the front part positioning body 151 and the rear part positioning body 152 are respectively provided with the first surfaces 157 and 159 and the second surfaces 158 and 160, the rear part positioning body 152 can be made small as compared to the first embodiment.

Moreover, since the second surfaces 158 and 160 are the inclined surfaces that incline in the frontward-rearward direction with respect to the frame array direction, the second surface 160 can be guided by the second surface 158 to smoothly perform positioning when the rear part positioning blocks 154a and 154b are made to abut against each other.

Next, a tire vulcanizer system in a third embodiment of the invention will be described with reference to the drawings.

Here, since the tire vulcanizer system of the third embodiment is different from the tire vulcanizer system of the above-described first embodiment only in terms of the configuration of the positioning unit, a description will be made with the same parts designated by the same reference numerals. Additionally, the description that duplicates the description of the first embodiment will be omitted.

Figure 12:
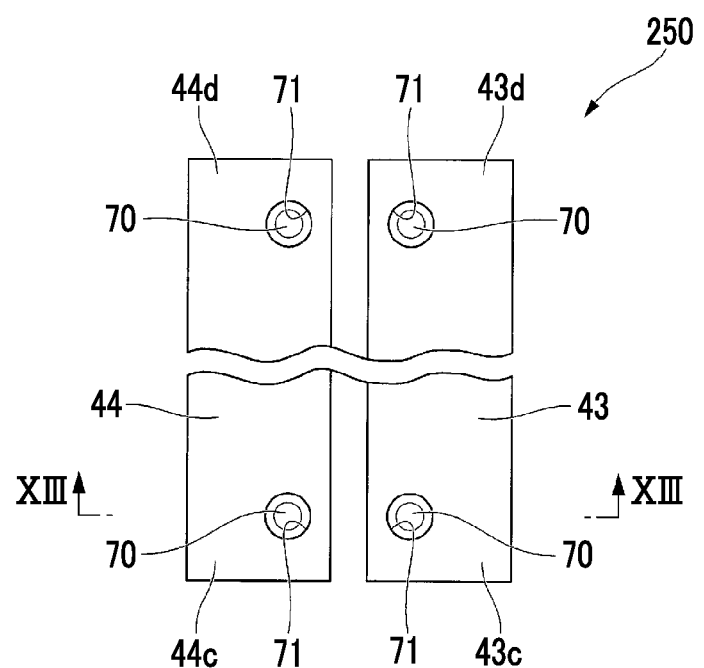
FIG. 12 is a plan view equivalent to FIG. 9 illustrating a positioning unit in a third embodiment of the invention.
Figure 13:
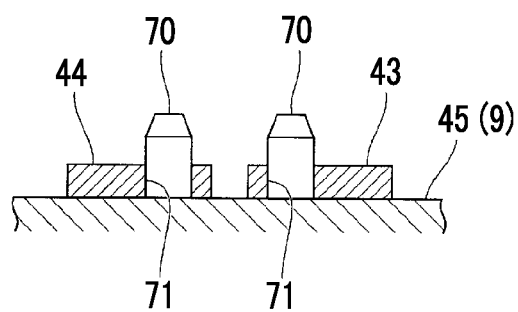
FIG. 13 is a sectional view taken along line XIII-XIII of FIG. 12.

FIG. 12 is a plan view equivalent to FIG. 9 illustrating a positioning unit in this embodiment. FIG. 13 is a sectional view taken along line XIII-XIII of FIG. 12. The positioning unit 250 includes a convex part 70 and a hole part (concave part) 71.

The convex part 70 is formed on the bearing part 45 of the mount 9 that supports the frame 3. One convex part 70 is provided at each of positions that face the front parts 43c and 44c of the leg units 43 and 44 and the rear parts 43d and 44d of the leg units 43 and 44. An upper end of the convex part 70 is formed such that the diameter thereof is reduced upward. By forming only an upper end of the convex part 70 in a diameter-reduced manner in this way, the convex part 70 can be smoothly inserted into the hole part 71. A case where the convex parts 70 are respectively formed in a columnar shape that protrudes upward has been described in this embodiment. However, the shape of the convex part 70 is not limited to the columnar shape as long as the convex part protrudes upward in a pillar shape.

The convex part 70 is inserted into the hole part 71. The hole part 71 is formed so as to have a slightly larger diameter than the external diameter of the convex part 70 such that the convex part 70 can be inserted thereinto, and the inserted convex part 70 is not displaced in the frame array direction and the frontward-rearward direction. The hole parts 71 are respectively formed in the front parts 43c and 44c of the leg units 43 and 44 and the rear parts 43d and 44d of the leg units 43 and 44.

Figure 10:
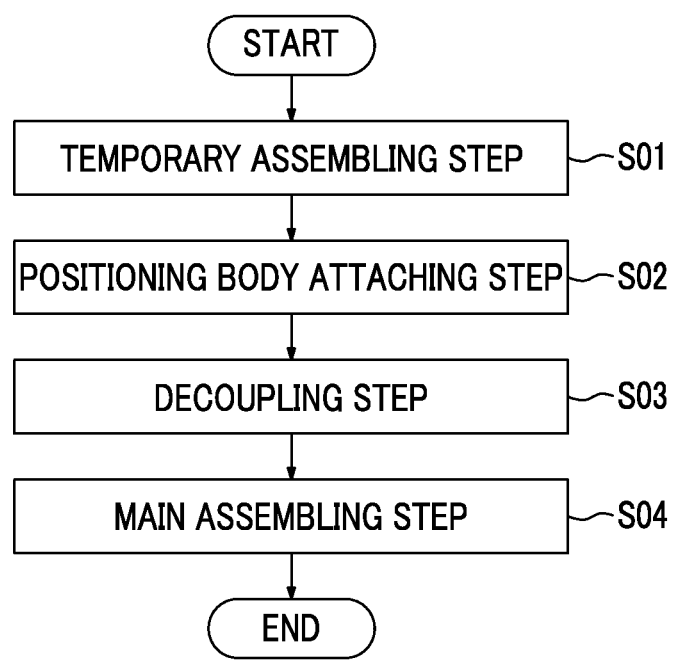
FIG. 10 is a flowchart of an assembly method for a tire vulcanizer system in the first embodiment of the invention.

The assembly method for a tire vulcanizer system using the above positioning unit 250 is the same as the procedure of FIG. 10 of the above-described first embodiment. For example, first, the hole parts 71 are formed in the leg units 43 and 44 in a state where the frames 3 are installed on the mounts 9 and are precisely positioned. Next, the convex parts 70 are screwed into the mounts 9 and attached thereto via the hole parts 71 (temporary assembling step). Thereafter, the coupled state between the frames 3 is released (decoupling step). Moreover, the mounts 9 on which the convex parts 70 are formed and the plurality of tire vulcanizers 2 are individually conveyed respectively. Thereafter, positioning of the frames 3 is performed such that the mounts 9 are installed in installation locations, such as a delivery destination and the convex parts 70 of the mounts 9 are inserted into the hole parts 71 of the frames 3 of the respective tire vulcanizers 2 (main assembling step).

Therefore, according to the tire vulcanizer system in the above-described third embodiment, positioning of the frames 3 adjacent to each other in the frontward-rearward direction and the frame array direction can be performed by arranging the leg units 43 and 44 such that the convex parts 70 that protrude upward from the bearing parts 45 of the mounts 9 are inserted into the hole parts 71 of the leg units 43 and 44. As a result, positioning of the frames in the frontward-rearward direction and the frame array direction can be easily performed.

Additionally, when being mainly assembled to the same mounts 9 as the mounts 9 used during temporary assembling, the relative planar positions of the frames 3 adjacent to each other can be determined with a smaller number of parts.

In addition, although the hole parts 71 passing through the leg units 43 and 44 up and down have been described as an example as the concave parts, the hole parts may not passes through the leg units so long as the insertion of the convex parts 70 therethrough is possible.

Next, a tire vulcanizer system in a fourth embodiment of the invention will be described with reference to the drawings.

Here, since the tire vulcanizer system of the fourth embodiment is different from the tire vulcanizer system of the above-described first embodiment only in terms of the configuration of the positioning unit, a description will be made with the same parts designated by the same reference numerals. Additionally, the description that duplicates the description of the first embodiment will be omitted.

Figure 14:
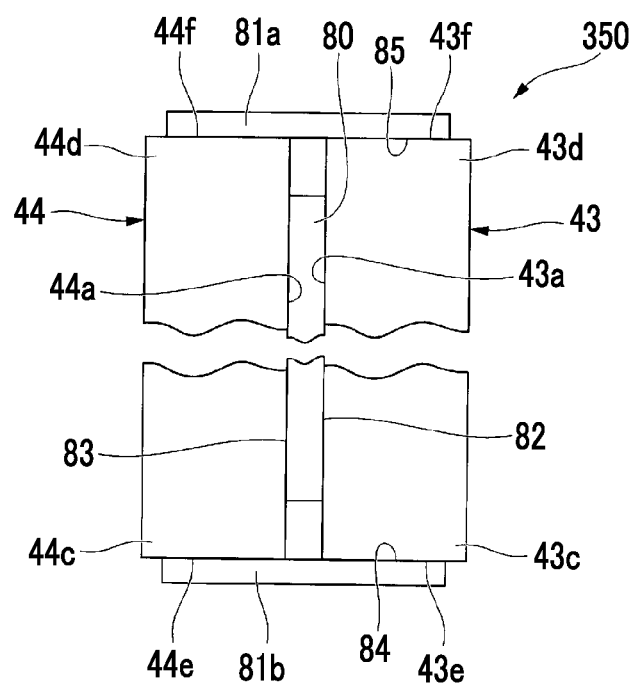
FIG. 14 is a plan view equivalent to FIG. 9 illustrating a positioning unit in a fourth embodiment of the invention.

FIG. 14 is a plan view illustrating a positioning unit 350 in the fourth embodiment of the invention.

As illustrated in FIG. 14, the positioning unit 350 includes a first convex part 80 and second convex parts 81a and 81b.

The first convex part 80 performs positioning of the leg units 43 and 44 of the frames 3 in the frame array direction. The first convex part 80 protrudes upward from the bearing parts 45 of the mounts 9 that support the frames 3. The first convex part 80 is formed in the shape of a flat plate that extends in the upward-downward direction and the frontward-rearward direction. The first convex part 80 is disposed at an intermediate part between the bearing parts 45 of the mounts 9 in the frame array direction. The first convex part 80 has first surfaces 82 and 83 that perform positioning of the leg units 43 and 44 of the frames 3 in the frame array direction.

In this embodiment, the mutually facing outer edges 43a and 44a of the leg units 43 and 44 are formed in a linear shape that extends in the frontward-rearward direction. Therefore, the first surfaces 82 and 83 are respectively flat surfaces capable of abutting against the whole regions of the outer edges 43a and 44a in the frontward-rearward direction. By changing the thickness of this first convex part 80 in the frame array direction, it is possible to change the distance in the array direction between the frames 3 adjacent to each other.

The second convex parts 81a and 81b perform positioning of the leg units 43 and 44 of the frames 3 in the frontward-rearward direction. The second convex parts 81a and 81b, similar to the first convex part 80, protrude upward from the bearing parts 45 of the mounts 9 that support the frames 3. The second convex parts 81a and 81b are formed in the shape of a flat plate that extends in the upward-downward direction and the frame array direction. The second convex parts 81a and 81b include second surfaces 84 and 85 that perform positioning of the leg units 43 and 44 in the frontward-rearward direction. The second surfaces 84 and 85 are arranged in parallel and face to face.

In this embodiment, front edges 43e and 44e and rear edges 43f and 44f of the leg units 43 and 44 are formed in a linear shape that extends in the frame array direction. Therefore, the second surface 84 is a flat surface capable of simultaneously abutting against both of the front edges 43e and 44e of the leg units 43 and 44. Additionally, the second surface 85 is a flat surface capable of simultaneously abutting against the rear edges 43f and 44f of the leg units 43 and 44.

The assembly method for a tire vulcanizer system using the above positioning unit 350 is the same as the procedure of FIG. 10 of the above-described first embodiment. The second convex parts 81a and 81b are fixed to the bearing parts 45 of the mounts 9 by welding or the like such that the second surface 84 abuts against the front edges 43e and 44e and the second surface 85 abuts against the rear edges 43f and 44f in a state where the frames 3 are precisely positioned (temporary assembling step). Here, in the fourth embodiment, similar to the third embodiment, after the decoupling step is performed, the mounts 9 are individually conveyed together with the tire vulcanizers 2, and the main assembling step is performed in an installation location that is a conveyance destination.

Therefore, according to the tire vulcanizer system of the above-described fourth embodiment, positioning of the frames 3 adjacent to each other in the frontward-rearward direction and the frame array direction can be performed by arranging the frames 3 such that the leg units 43 and 44 abut against the first convex part 80 and the second convex part 81. As a result, positioning of the frames 3 in the frontward-rearward direction and the frame array direction can be easily performed.

Next, a tire vulcanizer system in a fifth embodiment of the invention will be described with reference to the drawings. Here, since the tire vulcanizer system of the fifth embodiment is provided by substituting the second convex parts 81a and 81b of the positioning unit 350 of the above-described fourth embodiment with a key mechanism, a description will be made with the same parts designated by the same reference numerals. Additionally, the description that duplicates the description of the above-described respective embodiments will be omitted.

Figure 15:
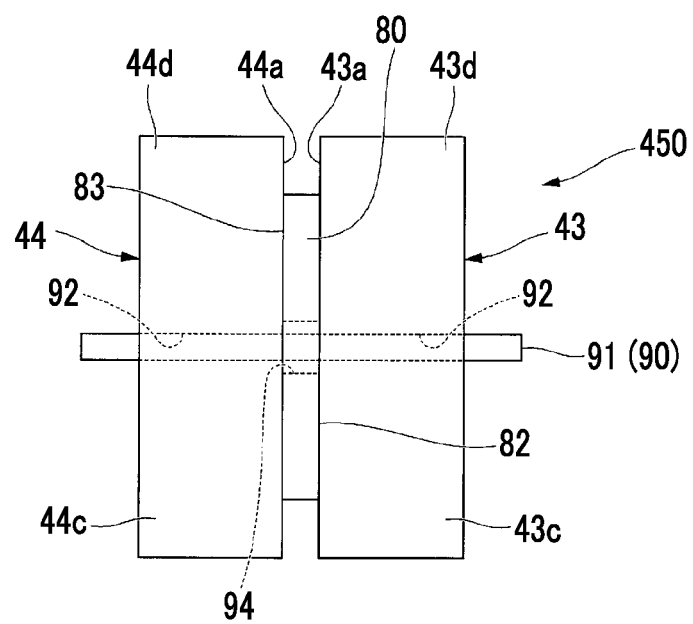
FIG. 15 is a plan view of a positioning unit in a fifth embodiment of the invention.
Figure 16:
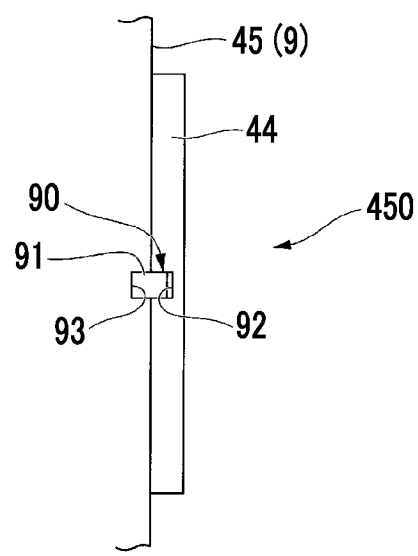
FIG. 16 is a side sectional view of a positioning unit in the fifth embodiment of the invention.

FIG. 15 is a plan view illustrating a positioning unit 450 in the fifth embodiment. FIG. 16 is a side sectional view of the positioning unit 450.

As illustrated in FIGS. 15 and 16, the positioning unit 450 includes the first convex part 80 and a key mechanism 90.

The first convex part 80 includes the first surfaces 82 and 83 that performs positioning of the leg units 43 and 44 of the frames 3 in the frame array direction. The first convex part 80 is formed so as to protrude upward from the bearing parts 45 of the mounts 9 that support the frames 3. Additionally, a through-hole 94 is formed in the first convex part 80 such that a key member 91 of the key mechanism 90 can be passed therethrough in the frame array direction.

The key mechanism 90 performs positioning of the leg units 43 and 44 in the frontward-rearward direction. The key mechanism 90 includes the key member 91, a frame-side key groove 92, and a mount-side key groove 93.

The key member 91 is formed in a pillar shape with a rectangular section. The length of the key member 91 is made larger than a length obtained by adding the width dimensions of the two leg units 43 and 44 to the width dimension of the first convex part 80. Here, the sectional shape of the key member 91 is not limited to the above-described rectangular shape.

The frame-side key groove 92 is a groove into which the key member 91 is inserted. The frame-side key groove 92 is formed in the lower surfaces of the leg units 43 and 44 of the frames 3. The frame-side key groove 92 is linearly formed in the frame array direction. The width dimension of the frame-side key groove 92 is made slightly larger than the width dimension of the key member 91 such that the key member 91 can be inserted into the frame-side key groove. The depth dimension of the frame-side key groove 92 is made equal to or lager than half of the height dimension of the key member 91 and made smaller than the height dimension of the key member 91.

The mount-side key groove 93 is arranged to face the frame-side key groove 92, and the key member 91 is able to be inserted into the mount-side key groove simultaneously with the frame-side key groove 92. The mount-side key groove 93 is formed in the upper surfaces of the bearing parts 45 of the mounts 9. The mount-side key groove 93 is linearly formed in the frame array direction, similar to the frame-side key groove 92. The width dimensions of the mount-side key groove 93 are also the same width dimension as the width dimension of the frame-side key groove 92. That is, the width dimension of the mount-side key groove 93 is made slightly larger than the width dimension of the key member 91 such that the key member 91 can be inserted into the mount-side key groove. The depth dimension of the mount-side key groove 93, similar to the depth dimension of the frame-side key groove 92, is also made equal to or larger than half of the height dimension of the key member 91 and made smaller than the height of the key member 91.

The assembly method for a tire vulcanizer system using the above positioning unit 450 is the same as the procedure of FIG. 10 of the above-described first embodiment. For example, first, the first convex part 80 is inserted between the leg units 43 and 44 in a state where the frames 3 are installed on the mounts 9 and precisely positioned. Next, the frame-side key groove 92 and the mount-side key groove 93 are formed at positions where the key grooves face each other. Moreover, the key member 91 is inserted from end sides of the frame-side key groove 92 and the mount-side key groove 93 (temporary assembling step).

Thereafter, the key member 91 is extracted and the coupled state between the frames 3 is released (decoupling step). Next, the mounts 9 on which the first convex part 80 is formed and the plurality of tire vulcanizers 2 is individually conveyed respectively. Then, the mounts 9 are installed in installation locations, such as a delivery destination. Moreover, positioning of the leg units 43 and 44 in the frame array direction is performed by making the outer edges 43a and 44a of the leg units 43 and 44 abut against the first surfaces 82 and 83 of the first convex part 80. Thereafter, positioning of the leg units 43 and 44 in the frontward-rearward direction is performed by inserting the key member 91 into the frame-side key groove 92 and the mount-side key groove 93 (main assembling step).

Therefore, according to the tire vulcanizer system of the above-described fifth embodiment, the leg units 43 and 44 of the frames 3 adjacent to each other can be respectively positioned in the frontward-rearward direction by the key mechanism 90. Additionally, positioning of the leg units 43 and 44 in the frame array direction can be performed by disposing the first convex part 80 between the leg units 43 and 44 of the frames 3 adjacent to each other. As a result, positioning of the frames 3 in the frontward-rearward direction and the frame array direction can be easily performed.

Moreover, when the key mechanism 90 is used, this is advantageous in that positioning of the leg units 43 and 44 in the frontward-rearward direction can be easily performed irrespective of the outer shape of the leg units 43 and 44 in a plan view.

In addition, the invention is not limited to the configuration of the above-described respective embodiments, and design changes can be made without departing from the concept of the invention.

A case where the second surfaces 58, 60, 158, and 160 are the inclined flat surfaces has been described in the above-described first and second embodiments. However, the second surfaces 58, 60, 158, and 160 are not limited to the inclined flat surfaces. For example, the second surfaces 58, 60, 158, and 160 may be flat surfaces that extend in the frame array direction and the upward-downward direction. Additionally, the second surfaces 58, 60, 158, and 160 may be curved surfaces or spherical surfaces.

Moreover, a case where the front part positioning blocks 53a and 53b are fixed to the leg units 43 and 44 with bolts, nuts, or the like has been exemplified in the above-described first embodiment. Additionally, a case where the rear part positioning blocks 54a and 54b are fixed by welding or the like has been exemplified. However, the method of fixing the front part positioning blocks 53a and 53b and the rear part positioning blocks 54a and 54b is not limited to the above method. For example, any one of welding, bonding, fastening with bolts, or the like may be appropriately selected.

Additionally, a case where two tire vulcanizers 2 are arranged side by side has been described in the above-described respective embodiments. However, the number of tire vulcanizers 2 to be arranged side by side is not limited to two. For example, three or more tire vulcanizers 2 may be arranged side by side.

Moreover, in the above-described respective embodiments, the gate type-shaped frames 3 have been described as an example. However, the shape of the frames 3 is not limited to the gate shape. Additionally, a case where only one key mechanism 90 is provided has been described in the above-described fifth embodiment. However, the key mechanisms 90 may be provided in two or more places, such as the front parts 43c and 44c, the rear parts 43d and 44d, and the like of the leg units 43 and 44.

Moreover, in the above-described first embodiment, an example in which the guide rail 39 of the tire unloader 26 is fixed so as to stretch over the frames adjacent to each other has been described as an example. However, the guide rail of at least one of the tire unloader 26 and the tire loader 25 may be attached so as to stretch over the frames as a fixing part.

INDUSTRIAL APPLICABILITY

In a tire vulcanizer system obtained by coupling a plurality of tire vulcanizers each including a frame and a vulcanizing mechanism supported by the frame to vulcanize a green tire, the machining time and the inspection time of the frames can be shortened, and it is possible to alleviate a burden on a worker caused by positioning work.

REFERENCE SIGNS LIST

1: TIRE VULCANIZER SYSTEM
2: TIRE VULCANIZER
3: FRAME
4: VULCANIZING MECHANISM
5: OPENING
6: SIDE WALL
7: UPPER FRAME
8: LOWER FRAME
9: MOUNT
10: MOLD
11: UPPER MOLD
12: LOWER MOLD
13: UPPER MOLD SUPPORTING MECHANISM
14: LOWER MOLD SUPPORTING MECHANISM
15: UPPER MOVABLE BODY
16: GUIDE BRACKET
17: PRESSURIZING FORCE TRANSMISSION MEMBER
18: PRESSURIZING CYLINDER
19: LIFTING CYLINDER
21: GUIDE RAIL
22: CENTER MECHANISM
23: LOWER PLATEN
25: TIRE LOADER (CARRYING-IN UNIT)
26: TIRE UNLOADER (CARRYING-OUT UNIT)
27: TURNING ARM
28: TIRE CHUCK
29: LOADER LIFTING MECHANISM
31: MAIN LIFT BODY
32: LIFTING CYLINDER
33: GUIDE RAIL
33a: MAIN RAIL BODY
34: TURNING ARM
35: TIRE CHUCK
36: UNLOADER LIFTING MECHANISM
37: MAIN LIFTBODY

38: LIFTING CYLINDER
39: GUIDE RAIL
39a: REAR SURFACE
39b: MAIN RAIL BODY
40: RIB
40a: SERVICE HOLE
41: FIRST END
42: SECOND END
43: LEG UNIT
43a: OUTER EDGE
43b: INCLINED EDGE
43c: FRONT PART
43d: REAR PART
43e: FRONT EDGE
43f: REAR EDGE
44: LEG UNIT
44a: OUTER EDGE
44b: INCLINED EDGE
44c: FRONT PART
44d: REAR PART
44e: FRONT EDGE
44f: REAR EDGE
45: BEARING PART (SUPPORT SURFACE)
47: FASTENING MEMBER
50: POSITIONING UNIT
51: FRONT PART POSITIONING BODY
52: REAR PART POSITIONING BODY
53a: FRONT PART POSITIONING BLOCK
53b: FRONT PART POSITIONING BLOCK
54a: REAR PART POSITIONING BLOCK
54aa: FRONT PART
54ab: REAR PART
54b: REAR PART POSITIONING BLOCK
54ba: FRONT PART
54bb: REAR PART
55: FIRST SURFACE
56: FIRST SURFACE
57: FIRST SURFACE
57a: END EDGE
58: SECOND SURFACE
59: FIRST SURFACE
59a: END EDGE
60: SECOND SURFACE
61: CONNECTING SURFACE
62: CONNECTING SURFACE
63: CONCAVE PART
64: CONVEX PART
65: THROUGH-HOLE
66: THROUGH-HOLE
67: BOLT
68: NUT
70: CONVEX PART
71: CONCAVE PART
80: FIRST CONVEX PART
81a: SECOND CONVEX PART
81b: SECOND CONVEX PART
82: FIRST SURFACE
83: FIRST SURFACE
84: SECOND SURFACE
85: SECOND SURFACE
90: KEY MECHANISM
91: KEY MEMBER
92: FRAME-SIDE KEY GROOVE
93: MOUNT-SIDE KEY GROOVE
151: FRONT PART POSITIONING BODY
152: REAR PART POSITIONING BODY
153a: FRONT PART POSITIONING BLOCK
153b: FRONT PART POSITIONING BLOCK
154a: REAR PART POSITIONING BLOCK
154b: REAR PART POSITIONING BLOCK
157: FIRST SURFACE
157a: END EDGE
158: SECOND SURFACE
159: FIRST SURFACE
160: SECOND SURFACE
C: CENTRAL PART
F: INSTALLATION SURFACE

The invention claimed is:

1. A tire vulcanizer system obtained by coupling a plurality of tire vulcanizers each including a frame and a vulcanizing mechanism supported by the frame to vulcanize a green tire,
wherein the plurality of tire vulcanizers include:
a positioning unit that is provided in a leg unit that is provided to each of the frames and is arranged to determine relative planar positions of the frames adjacent to each other,
wherein the tire vulcanizer system includes at least one of a carrying-in unit that is arranged to carry in a non-vulcanized green tire to the tire vulcanizers, and a carrying-out unit that is arranged to carry out a vulcanized tire, and
wherein the at least one of the carrying-in unit and the carrying-out unit includes a guide rail that extends in the upward-downward direction and is coupled to the respective frames so as to stretch over the frames as a fixing part that performs positioning of the frames.

2. The tire vulcanizer system according to claim 1,
wherein the positioning unit includes a plurality of positioning bodies that is disposed at positions different from each other in a frontward-rearward direction perpendicular to a frame array direction in which the frames are coupled together and arrayed, and
wherein the positioning body includes a pair of positioning blocks that are arranged side by side in the frame array direction in which the frames are coupled together, are respectively fixed to the frames adjacent to each other, and abut against each other.

3. The tire vulcanizer system according to claim 2,
wherein the positioning blocks provided in at least one positioning body of the plurality of positioning bodies include a first surface that performs positioning in the frame array direction and a second surface that performs positioning in the frontward-rearward direction.

4. The tire vulcanizer system according to claim 3,
wherein the second surface is an inclined surface that inclines in the frontward-rearward direction with respect to the frame array direction.

5. The tire vulcanizer system according to claim 3,
wherein the positioning blocks provided in at least one positioning body of the plurality of positioning bodies include only a first surface that performs positioning in the frame array direction.

6. The tire vulcanizer system according to claim 1, further comprising:
a mount that has a convex part on a support surface that supports the frame; and
the frame that has a concave part that allows the convex part to be inserted thereinto, and
wherein the positioning unit includes the convex part and the concave part.

7. The tire vulcanizer system according to claim 1,
wherein the positioning unit includes:

a first convex part that protrudes upward from a support surface of a mount that supports the frame and has a first surface that performs positioning of the leg unit of the frame in the frame array direction in which the frames are coupled together and arrayed; and a second convex part that protrudes upward from the support surface of the mount that supports the frame and has a second surface that performs positioning of the leg unit in a frontward-rearward direction perpendicular to the frame array direction.

8. The tire vulcanizer system according to claim 1, further comprising:

the frame including the leg unit that has a frame-side key groove formed in a lower surface thereof; and a mount having a mount-side key groove on a support surface that supports the leg unit, wherein the positioning unit includes:

a key mechanism that has the frame-side key groove, the mount-side key groove, and a key member and performs positioning in a frontward-rearward direction perpendicular to the frame array direction in which the frames are coupled together and arrayed; and a first convex part that protrudes upward from the support surface of the mount that supports the frame and has a first surface that performs positioning of the leg unit of the frame in the frame array direction.

9. An assembly method for a tire vulcanizer system obtained by coupling a plurality of tire vulcanizers each including a frame provided with a leg unit and a vulcanizing mechanism supported by the frame to vulcanize a green tire, the method comprising:

a temporary assembling step of adjusting the positions of the frames adjacent to each other and temporarily coupling the frames together;

a positioning body attaching step of attaching positioning bodies for positioning to the leg units of the temporarily coupled frames, respectively;

a decoupling step of releasing the coupling between the frames with the positioning bodies attached thereto; and a main assembling step of respectively attaching the frames between which the coupling has been released to installation locations such that the relative positions of the frames are constrained by the positioning bodies, and such that a guide rail of at least one of a carrying-in unit that is arranged to carry in a non-vulcanized green tire to the tire vulcanizers, and a carrying-out unit that is arranged to carry out a vulcanized tire, that extends in the upward-downward direction is coupled to the respective frames so as to stretch over the frames as a fixing part.

* * * * *